United States Patent Office 2,921,873
Patented Jan. 19, 1960

2,921,873

UNSATURATED COMPOSITIONS STABILIZED AGAINST COPPER AND COPPER WIRES COATED WITH SAID COMPOSITIONS

Dow A. Rogers, Jr., Wilkins Township, Allegheny County, Pa., assignor to Westinghouse Electric Corporation, East Pittsburgh, Pa., a corporation of Pennsylvania No Drawing. Application December 20, 1957
Serial No. 704,018

4 Claims. (Cl. 117—232)

The present invention reates to polymerizable unsaturated compositions such as vinyl compounds and has particular reference to compositions of matter containing polymerizable unsaturated compositions and to processes for polymerizing the same in the presence of copper.

Heretofore, it has been a problem in the electrical industry to polymerize vinyl monomers such as monostyrene, vinyl acetate, and diallyl phthalate as well as unsaturated polyesters in the presence of copper. Such monomers and esters develop an undesirable greenish color when contacted with copper and copper compounds. In addition, the presence of even minute amounts of copper tends to inhibit the polymerization of the monomer, either alone or in combination with other copolymerizable substances.

Thus, in general, previous attempts to polymerize vinyl compounds in the presence of copper resulted in the formation of a jelly-like mass, rather than in the formation of the desired hard, solid, fully polymerized product.

The surprising discovery has now been made that vinyl compounds can be polymerized completely to hard, solid resinous products, even in the presence of copper, when the polymerization is carried out in the presence of certain classes of chemical compounds.

The object of the present invention is to provide compositions of matter containing polymerizable unsaturated compositions such as vinyl compounds which are capable of complete polymerization, even in the presence of copper, the compositions including a specific heterocyclic nitrogen containing compound, in addition to the polymerizable vinyl compound itself.

Another object of the present invention is to provide compositions of matter containing polymerizable unsaturated compositions such as vinyl compounds which are capable of complete polymerization, even in the presence of copper, the compositions including both (a) at least one metal salt of an organic acid and (b) a specific heterocyclic nitrogen containing compound, in addition to the polymerizable vinyl compound itself.

Another object of the invention is to provide a process for converting polymerizable vinyl compounds to solid polymeric resinous products in the presence of copper by carrying out the polymerization in the presence of a metal deactivator including both (a) a metal salt of at least one organic acid and (b) a specific heterocyclic nitrogen containing compound.

A still further object of the invention is to provide copper electrical members having solid insulation thereon, the insulation comprising a completely cured polymerizable vinyl compound, at least one metal salt of at least one organic acid, and a specific heterocyclic nitrogen containing compound.

Other and further objects of the invention will, in part, be obvious and will, in part, appear hereinafter.

The foregoing objects are attained by adding, to compositions containing polymerizable unsaturated compounds, critical amounts of a metal deactivator comprising (1) at least one metal salt of at least one organic acid selected from the group consisting of saturated and unsaturated aliphatic acids, cyclic acids, and aromatic acids, and (2) a specific heterocyclic nitrogen containing compound.

More specifically, this invention provides a process which comprises admixing with a polymerizable composition containing polymerizable unsaturated compounds having the group >C=C< a metal deactivator comprising (a) from 0.001% to 0.5% by weight, based on the weight of the polymerizable composition, of at least one metal salt of at least one organic acid selected from the group consisting of saturated and unsaturated aliphatic acids, cyclic acids, and aromatic acids, and (b) from 0.002% to 2% by weight, based on the weight of the composition, of a specific heterocyclic nitrogen containing compound.

The metal deactivator herein described stabilizes the polymerizable vinyl compounds against the deleterious effects of copper and permits the polymerization of such vinyl compounds to solid products even in the presence of copper and copper compounds.

That portion of the metal deactivator (a) which comprises metal salts of certain organic acids may be prepared from linolates, resinates, naphthenates, acetates, aromatic benzoates, octoates, tallates, stearates, and the like of metals including aluminum, calcium, cesium, chromium, cobalt, iron, lead, manganese, nickel, tin, titanium, vanadium, zinc, and zirconium. Two or more metal salts may be employed jointly in forming this portion of the metal deactivator of this invention.

The other portion of the curing catalytic composition comprises a heterocyclic nitrogen containing compound having the formula

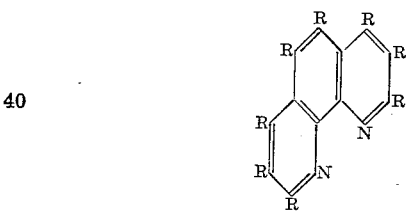

where each R is selected from the group consisting of hydrogen, halogen, nitro, sulfo, hydroxyl, carbonyl, carboxyl, and monovalent aliphatic hydrocarbon radicals. Preferably, R is an aliphatic radical and may be primary, secondary, or tertiary, for example, methyl, ethyl, butyl, isopropyl, isobutyl, secondary butyl, tertiary butyl, amyl, hexyl, and the like. The aliphatic radicals substituted on the ring structure may be alike or different. Particularly satisfactory results are obtainable when R is primary and contains from 1 to 8 carbon atoms per molecule. Excellent results have been obtained using 1,10-phenanthroline and this is the compound preferred in practicing the invention.

Examples of unsaturated compositions capable of vinyl type polymerization which may be polymerized, even in the presence of copper ions, using the metal deactivator of the present invention include those compounds containing at least one ethylenically unsaturated group >C=C< capable of addition-type polymerization. Examples of suitable compounds of this type include monostyrene, alphamethylstyrene, 2,4-dichlorostyrene, paramethylstyrene, vinyl acetate, methylmethacrylate, ethylacrylate, methallylacrylate, diallyl phthalate, diallyl succinate, diallyl maleate, diallyl adipate, methallyl alcohol, acrylonitrile, methylvinyl ketone, diallyl ether, vinylidene chloride, butylmethacrylate, allyl acrylate, allyl crotonate, 1,3-chloroprene, divinyl benzene, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl actate), sebacyl bis-(allyl lactate), phthalyl bis-(allyl lactate), fumaryl bis-(allyl glycolate), carbonyl bis-(allyl gycolate), carbonyl bis-(allyl salicylate), tetra-(allyl glycolate) silicate, and tetra-(allyl lactate) silicate. These liquid monomers may be used singly or in mixtures of any two or more.

Numerous other unsaturated compositions may be polymerized in the presence of copper employing the metal deactivators of this invention. Such other compositions include unstaurated polyester resins and mixtures thereof, with unsaturated polymerizable liquid monomers having this group >C=C<. Particularly good results have been secured by employing as the polyester resins the reaction product of a polyhydric alcohol and an alpha, beta ethylenically unsaturated dicarboxylic acid or anhydride thereof such, for example, as maleic acid, fumaric acid, maleic anhydride, monochloromaleic acid, itaconic acid, itaconic anhydride, citraconic acid, and citraconic anhydride. The alpha, beta unsaturated dicarboxylic acids or anhydrides, which may be used singly or in mixtures of two or more, are heated with a polyhydric alcohol such as ethylene glycol, glycerol, or pentaerythritol or mixtures thereof, or an unsaturated alcohol such as allyl alcohol, or methallyl alcohol. For example, castor oil has been employed successfully in reactions with maleic anhydride and the resultant castor oil maleate ester admixed with the polymerizable unsaturated monomer, for example, monostyrene.

Vinyl compounds, when admixed with the metal deactivator of this invention, will polymerize to solid products, even in the presence of copper, upon the addition of a free-radical catalyst. Heat may be used to accelerate the polymerization.

Suitable examples of such catalysts include benzoyl peroxide, lauroyl peroxide, t-butyl hydroperoxide, di-t-butyl peroxide, ascaridole, tert-butyl perbenzoate, di-t-butyl diperphthalate, 2,2-di-t-butylperoxy butane, cumene hydroperoxide, and dicumyl peroxide. These catalysts may be used singly or in admixtures of two or more. In general, such catalysts or catalyst mixtures are employed in an amount of from about 0.1% to 2% by weight, although somewhat larger or smaller amounts may be employed if desired.

The compositions also may be cured, in the absence of catalysts, by subjecting them to either ultraviolet light or irradiation, including gamma rays or electron beam radiation, which latter may be obtained from a Van de Graaf generator or from a radioactive material such as radioactive cobalt which will apply electrons and gamma rays thereto. The compositions may be subjected to electron beam radiation of at least 0.05 m.e.v. to apply from 2 to 50 mega REP to produce thermoset solid polymers.

The unsaturated compositions of this invention may be admixed with fillers of various kinds such as silica, hydrated alumina, titanium dioxide, glass fibers, wood flour, mica, graphite, and calcium silicate. In some instances, certain finely divided synthetic fibers may be incorporated in the mixture such as nylon, Orlon, Dacron, and the like. It will be understood, of course, that fillers may be used singly or in combinations of two or more.

The invention also is applicable to compositions of matter containing polymerizable vinyl compounds which have small amounts of polymerization inhibitors incorporated therein to prevent premature polymerization of the compositions during storage and shipping. Inhibitors which generally are used for this purpose include substituted phenols and aromatic amines. More specifically, examples of such inhibitors are hydroquinone, resorcinol, tannin, sym. alpha, beta naphthyl amine, p-phenylene diamine, and the like.

In order to indicate even more fully the advantages and capabilities of the metal deactivators of the present invention, the following specific examples are set forth. The parts given are by weight unless otherwise indicated.

Example I (A) A mixture of about 5 mols of 4,4'-dihydroxydiphenyl-dimethylmethane and about 9 mols of an aqueous 40% solution of sodium hydroxide are heated under reflux at a temperature of about 80° C. to 85° C. and about 7 mols of ethylene chlorohydrin are added during a period of about 30 minutes. Heating is continued for an additional 3½ hours, after which time the mixture is washed with water and the product obtained from the mixture by distilling the same under vacuum.

(B) About 5.5 mols of the hydroxy alkyl ether thus prepared are placed in a reaction vessel. A one liter per minute flow of nitrogen gas is bubbled through the material to enable sparging thereof, and heat and agitation are applied. When the temperature of the material being agitated has reached approximately 125° C. about 4 mols of adipic acid then are introduced into the reaction vessel. The resultant mixture is then heated to a temperature from about 150° C. to 160° C. and held there for approximately 3 hours, the water of reaction formed during the esterification being carried off by the sparging gas.

(C) The esterified product thus obtained then is cooled to 125° C. whereupon 1 mol of maleic anhydride is introduced into the reaction vessel. The resultant mixture then is heated to a temperature of about 200° C. for a period of about 9 hours with agitation.

The product thus obtained is a viscous resinous unsaturated polyester which may be blended with a liquid reactive unsaturated monomer, such as monostyrene. A suitable polymerizable resinous composition is prepared by admixing about 15% by weight of the resinous polyester thus prepared with about 85% by weight of monostyrene. The composition thus prepared, when catalyzed with 0.5% by weight benzoyl peroxide in the absence of copper, had a gel time of 7 minutes 48 seconds at 90° C. After post-curing for 16 hours at 80° C. and 4 hours at 135° C., the copolymer had a hardness value of 85 on the Shore Durometer "D" scale at room temperature (26° C.).

A strip of bare rectangular copper wire measuring .102 inch x .325 inch was immersed in another sample of the above catalyzed polyester-monostyrene composition and allowed to stand for 24 hours at room temperature. After standing for 25 minutes at 90° C., a layer of the resin composition adjacent the copper surfaces had turned into a green colored gel. After standing for 16 hours at 80° C., the resin was vivid green in color and so inhibited that it would not polymerize beyond a gel stage and a hardness value could not be determined.

A third sample of the resin composition was admixed with 0.004% by weight of 1,10-phenanthroline. The mixture was allowed to stand 24 hours at room temperature with a similar strip of copper immersed therein. The resin gelled in 10 minutes 20 seconds with no sign of green color development.

A fourth sample of the resin composition was admixed with 0.018% of 1,10-phenanthroline plus 0.0215% of lead naphthenate. The mixture was allowed to stand 24 hours at room temperature with a similar strip of copper immersed therein. The gel time of the copolymerizate was 8 minutes 5 seconds with no sign of green color development. After 16 hours at 80° C. the resulting fully hardened and cured resin had a Shore Durometer "D" reading of 85. There was no sign of green discoloration and the solid resin composition adhered firmly to the copper.

Example II

Ten grams of diethoxytrivinyltriphenyltrisiloxane was added to each of two test tubes. The material was catalyzed with 1% by weight of tertiary butyl perbenzoate. Two pieces of rectangular copper strap each 10 inches in length and weighing 38 grams were each formed into a U-shape. One piece was immersed in the catalyzed siloxane in each of the tubes so that one-half of the formed piece was exposed to the air. To only one test tube there was added the following metal deactivator of this invention: 0.02% of 1,10-phenanthroline plus 0.012% of zinc naphthenate. The deactivator was completely compatible with the siloxane. No deactivator was added to the other tube. After 16 hours at 135° C. the sample in the tube without the metal deactivator was so badly inhibited by the copper that it had not polymerized and additional heating at 150° C. did not polymerize the siloxane. The tube containing the copper deactivator had polymerized completely and quickly to a hard, dense homopolymer.

*Example III*

A castor oil maleate-styrene resin composition was prepared by heating about 30 parts of castor oil and about 10 parts of maleic anhydride to a temperature within the range of about 100° C. to 140° C. for from two to four hours. About 65% by weight of this viscous ester was mixed with about 35% by weight of monostyrene. Since this composition, as prepared, is quite acid as compared to other resins, it turns green in color after only a few minutes contact with copper. After a few hours exposure the resinous composition is so badly inhibited that it cannot be polymerized to a solid. However, another sample containing metal deactivator, in this case 0.2% of 1,10-phenanthroline plus 0.04% of zinc naphthenate, did not turn green and polymerized to a firmly cured, hard polymer in the presence of the copper.

The compositions of this invention are particularly applicable as coatings for electrically conducting copper wire, strap, rod, coils, windings, and the like. The compositions polymerize directly to the copper and adhere tenaciously thereto. The invention therefore obviates the need of wrapping the copper with cloth or applying enamel or varnish coatings prior to application of the insulating resin as was necessary heretofore.

While the present invention has been described with respect to what is at present considered to be preferred embodiments thereof, it will be understood that certain changes, modifications, substitutions, and the like may be made therein without departing from its true scope.

I claim as my invention:

1. In the process of insulating a copper electrical conductor which includes polymerizing an unsaturated vinylidene composition having the group >C=C< by heating the composition in the presence of a polymerization catalyst while the composition is in contact with said copper conductor, the improvement which comprises carrying out the polymerization in the presence of from 0.002% to 2% by weight, based on the weight of the unsaturated composition, of a heterocyclic nitrogen containing compound having the formula

where each R is selected from the group consisting of hydrogen, halogen, nitro, sulfo, hydroxyl, carbonyl, carboxyl, and monovalent aliphatic hydrocarbon radicals.

2. In the process of insulating a copper electrical conductor which includes polymerizing an unsaturated vinylidene composition having the group >C=C< by heating the composition in the presence of a polymerization catalyst while the composition is in contact with said copper conductor, the improvement which comprises carrying out the polymerization in the presence of both (A) from 0.001% to 0.5% by weight, based on the weight of the unsaturated composition, of at least one metal salt of at least one organic acid selected from the group consisting of saturated and unsaturated aliphatic acids, and aromatic acids, and (B) from 0.002% to 2% by weight, based on the weight of the unsaturated composition, of a heterocyclic nitrogen containing compound having the formula

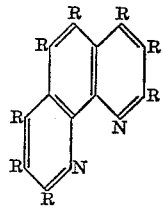

where each R is selected from the group consisting of hydrogen, halogen, nitro, sulfo, hydroxyl, carbonyl, carboxyl, and monovalent aliphatic hydrocarbon radicals.

3. In the process of insulating a copper electrical conductor which includes polymerizing an unsaturated vinylidene composition having the group >C=C< by heating the composition in the presence of a polymerization catalyst while the composition is in contact with said copper conductor, the improvement which comprises carrying out the polymerization in the presence of both (A) from 0.001% to 0.5% by weight, based on the weight of the unsaturated compositions, of cobalt naphthenate and (B) from 0.002% to 2% by weight, based on the weight of the unsaturated compositions, of 1,10-phenanthroline.

4. An electrical member comprising a copper electrical conductor having solid insulation in direct contact therewith, said solid insulation comprising an unsaturated vinylidene composition having the group >C=C< which has been polymerized while in direct contact with the copper conductor by heating the composition in the presence of (1) a polymerization catalyst, (2) from 0.001% to 0.5% by weight, based on the weight of the unsaturated composition, of at least one metal salt of at least one organic acid selected from the group consisting of saturated and unsaturated aliphatic acids and aromatic acids, and (3) from 0.002% to 2% by weight, based on the weight of the unsaturated composition, of a heterocyclic nitrogen containing compound having the formula

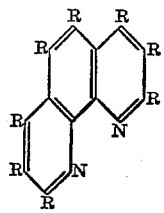

where R is selected from the group consisting of hydrogen, halogen, nitro, sulfo, hydroxyl, carbonyl, carboxyl, and monovalent aliphatic hydrocarbon radicals.

References Cited in the file of this patent
UNITED STATES PATENTS

| | | |
|---|---|---|
| 2,524,536 | Nordlander et al. | Oct. 3, 1950 |
| 2,565,897 | Wheeler | Aug. 28, 1951 |
| 2,566,739 | Moore et al. | Sept. 4, 1951 |
| 2,578,910 | Uraneck | Dec. 18, 1951 |